(12) United States Patent
Hori et al.

(10) Patent No.: US 9,404,406 B2
(45) Date of Patent: Aug. 2, 2016

(54) CATALYST FOR USE IN A PROCESS FOR PURIFYING EXHAUST GAS FROM GASOLINE ENGINES OF A FUEL-DIRECT-INJECTION TYPE

(71) Applicants: Umicore Shokubai Japan Co., Ltd., Tokyo (JP); Umicore Shokubai USA Inc., Auburn Hills, MI (US)

(72) Inventors: Masao Hori, Himeji (JP); Akihisa Okumura, Himeji (JP); Makoto Horiuchi, Himeji (JP)

(73) Assignees: UMICORE SHOKUBAI JAPAN CO., LTD., Tokyo (JP); UMICORE SHOKUBAI USA INC., Auburn Hills, MI (US)

( * ) Notice: Subject to any disclaimer, the term of this patent is extended or adjusted under 35 U.S.C. 154(b) by 19 days.

(21) Appl. No.: 13/875,091

(22) Filed: May 1, 2013

(65) Prior Publication Data
US 2013/0239555 A1    Sep. 19, 2013

Related U.S. Application Data

(60) Division of application No. 10/600,571, filed on Jun. 23, 2003, now abandoned, which is a continuation of application No. 08/875,577, filed as application No. PCT/JP96/03561 on Dec. 5, 1996, now abandoned.

(30) Foreign Application Priority Data

Dec. 6, 1995    (JP) .................................... 07-318374

(51) Int. Cl.
*F01N 3/00*    (2006.01)
*F01N 3/10*    (2006.01)
(Continued)

(52) U.S. Cl.
CPC ................ *F01N 3/10* (2013.01); *B01D 53/945* (2013.01); *B01D 53/9495* (2013.01);
(Continued)

(58) Field of Classification Search
CPC ........... F01N 3/10; F01N 3/20; F01N 3/0842; F02B 2075/125; F02B 23/104; F02D 2041/389; F02D 41/1475; F02M 69/045; Y02T 10/123; Y02T 10/22; B01D 53/945; B01D 53/9495; C01B 7/0743
USPC .................. 60/285, 299; 502/65, 74; 423/212
See application file for complete search history.

(56) References Cited

U.S. PATENT DOCUMENTS 3,986,350 A    10/1976 Schmidt ......................... 60/274
4,541,996 A    9/1985 Pereira et al. .................. 60/239
(Continued)

FOREIGN PATENT DOCUMENTS

CA    1125265 A    6/1982
CA    1154937 A    10/1983
(Continued)

OTHER PUBLICATIONS

Communication from the European Patent Office enclosing European Search Report dated Jul. 16, 1999.

*Primary Examiner* — Thomas Denion
*Assistant Examiner* — Diem Tran
(74) *Attorney, Agent, or Firm* — Kubovcik & Kubovcik

(57) ABSTRACT

A catalyst for use in a process for purifying exhaust gas from a gasoline engine of the fuel-direct-injection type that varies, in response to changes in the air-fuel ratio, between a first exhaust-gas state featured by an air-fuel ratio in the vicinity of the stoichiometrical air-fuel ratio, and a second exhaust-gas state that forms a more oxidizing, low-temperature atmosphere and that is featured by an air-fuel ratio greater than the stoichiometrical air-fuel ratio, the catalyst being obtained by causing a noble metal and a rare-earth oxide and/or a transition metal to be carried by or to be mixed with a fire-resistant inorganic oxide.

8 Claims, 1 Drawing Sheet

(51) Int. Cl.

| | | |
|---|---|---|
| *B01D 53/94* | (2006.01) | |
| *F01N 3/08* | (2006.01) | |
| *F01N 3/20* | (2006.01) | |
| *F02D 41/14* | (2006.01) | |
| *F02M 69/04* | (2006.01) | |
| *F02B 23/10* | (2006.01) | |
| *F02B 75/12* | (2006.01) | |
| *F02D 41/38* | (2006.01) | |

(52) U.S. Cl.
 CPC ............ *F01N 3/0842* (2013.01); *F01N 3/20* (2013.01); *F02D 41/1475* (2013.01); *F02M 69/045* (2013.01); *F02B 23/104* (2013.01); *F02B 2075/125* (2013.01); *F02D 2041/389* (2013.01); *Y02T 10/123* (2013.01); *Y02T 10/22* (2013.01)

(56) References Cited

U.S. PATENT DOCUMENTS

| | | | | |
|---|---|---|---|---|
| 4,924,820 A | 5/1990 | Lear et al. | | 60/302 |
| 4,938,178 A | 7/1990 | Schlunke et al. | | 123/302 |
| 5,051,392 A | 9/1991 | Mabilon et al. | | 502/303 |
| 5,075,276 A | 12/1991 | Ozawa et al. | | 502/304 |
| 5,174,111 A | 12/1992 | Nomura et al. | | 60/285 |
| 5,207,058 A | 5/1993 | Sasaki et al. | | 60/284 |
| 5,211,010 A | 5/1993 | Hirota | | 60/280 |
| 5,211,147 A | 5/1993 | Ward | | 123/418 |
| 5,245,975 A | 9/1993 | Ito | | 60/301 |
| 5,272,871 A | 12/1993 | Oshima et al. | | 60/274 |
| 5,313,792 A | 5/1994 | Katoh et al. | | 60/301 |
| 5,402,641 A | 4/1995 | Katoh et al. | | 60/285 |
| 5,404,719 A | 4/1995 | Araki et al. | | 60/276 |
| 5,492,678 A | 2/1996 | Ota et al. | | 60/299 |
| 5,564,404 A | 10/1996 | Takahashi et al. | | 123/676 |
| 5,575,266 A | 11/1996 | Iida | | 123/680 |
| 5,643,542 A | 7/1997 | Leyrer et al. | | 423/212 |
| 5,664,049 A | 9/1997 | Kondo et al. | | 60/300 |
| 5,730,099 A | 3/1998 | Gillespie | | 60/285 |
| 5,768,887 A | 6/1998 | Nakamura et al. | | 60/274 |
| 5,850,731 A | 12/1998 | Beebe et al. | | 60/723 |

FOREIGN PATENT DOCUMENTS

| | | |
|---|---|---|
| CA | 1213874 A | 11/1986 |
| CA | 2036006 C | 8/1991 |
| CA | 2064977 C | 10/1992 |
| CA | 2057634 A1 | 12/1992 |
| CA | 2079415 A1 | 1/1994 |
| CA | 2141564 A1 | 2/1994 |
| CA | 1331375 C | 8/1994 |
| CA | 1335278 C | 4/1995 |
| CA | 1335890 C | 6/1995 |
| DE | 40 03 515 A1 | 8/1991 |
| EP | 0 462 593 A1 | 12/1991 |
| EP | 0 488 254 A1 | 6/1992 |
| EP | 0 577 879 A1 | 1/1994 |
| EP | 0 665 048 A1 | 8/1995 |
| JP | 60-I25250 | 7/1985 |
| JP | 63-100919 | 5/1988 |
| JP | 1-171625 | 7/1989 |
| JP | 03-068525 U | 7/1991 |
| JP | 04-027431 A | 1/1992 |
| JP | 04-059049 | 2/1992 |
| JP | 04-231645 A | 8/1992 |
| JP | 04-259643 A | 9/1992 |
| JP | 05-168860 A | 7/1993 |
| JP | 06-31173 A | 2/1994 |
| JP | 06-074023 | 3/1994 |
| JP | 06-099069 A | 4/1994 |
| JP | 06-327980 A | 11/1994 |
| JP | 07-15555 A | 6/1995 |
| JP | 07-189660 | 7/1995 |
| JP | 07-213902 A | 8/1995 |
| JP | 07-232064 A | 9/1995 |
| JP | 08-82234 A | 3/1996 |
| WO | 93/08383 | 4/1993 |

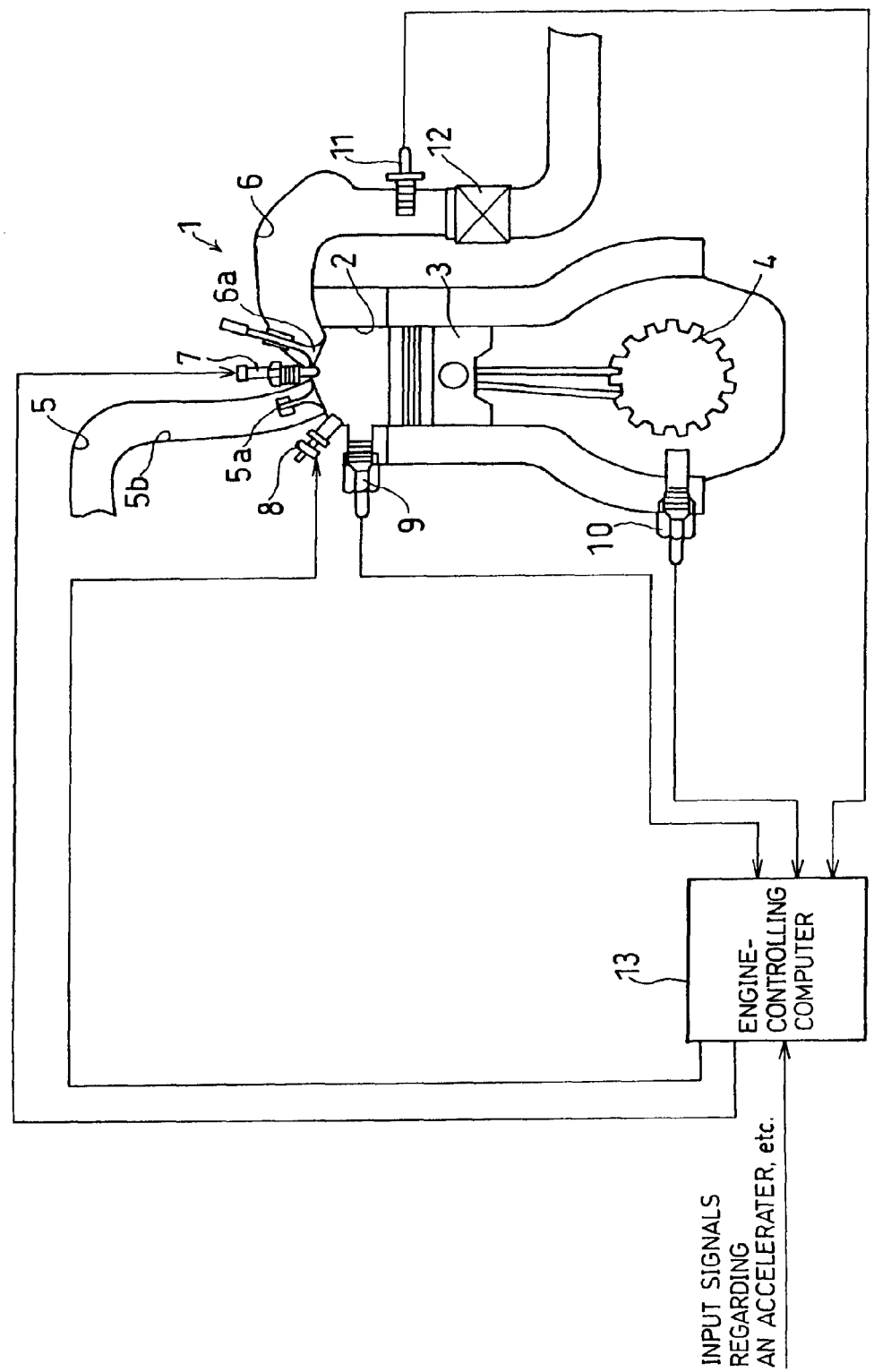

CATALYST FOR USE IN A PROCESS FOR PURIFYING EXHAUST GAS FROM GASOLINE ENGINES OF A FUEL-DIRECT-INJECTION TYPE

This application is a division of application Ser. No. 10/600,571, filed Jun. 23, 2003, which is a continuation of application Ser. No. 08/875,577, filed Oct. 20, 1997, which is a 371 of international application PCT/JP96/03561, filed Dec. 5, 1996, which claims priority based on Japanese Patent Application No. 7-318374, filed Dec. 6, 1995, and which are incorporated herein by reference.

FIELD OF THE INVENTION

The present invention relates to a catalyst for use in a process for purifying exhaust gas from gasoline engines, in particular from gasoline engines of the fuel-direct-injection type.

BACKGROUND OF THE INVENTION

In recent years, for gasoline engines that serve driving systems for cars, etc., the introduction of gasoline engines of the fuel-direct-injection type that directly inject fuel into a combustion cylinder has been studied in order to improve the fuel economy and output.

In such a gasoline engine of the fuel-direct-injection type, during a constant-speed operation, it is preferable to operate the engine at a lean burn mode that provides an excessive amount of air-intake in relation to the fuel, rather than to operate it at a stoichiometrical air-fuel ratio that is an air-fuel ratio capable of purifying exhaust gas effectively, in order to improve the fuel economy.

In this gasoline engine of the fuel-direct-injection type, the temperature of the exhaust gas, measured at a position in which catalyst for purifying the exhaust gas is applied, is as low as 200 to 350° C., as compared with the temperature of the exhaust gas of a conventional gasoline engine that is operating at the same air-fuel ratio as the gasoline engine of the fuel-direct-injection type, that is, at the lean burn mode.

Moreover, in the gasoline engine of the fuel-direct-injection type, during an accelerating operation and a high-load operation such as operations upon passing and slope-climbing, it is preferable to operate the engine at an air-fuel ratio in the vicinity of the stoichiometrical air-fuel ratio in order to maintain a safe operation at high torques; and in this case, the exhaust gas temperature is in the range of 300 to 800° C. at the catalyst-applying position.

Conventionally, various researches have been carried out on catalysts for removing nitrogen oxides (hereinafter, referred to as $NO_x$) from exhaust gas from an internal combustion engine under an atmosphere of excessive oxygen, that is, under an exhaust-gas atmosphere when it is driven at the lean burn mode.

For example, in the case when $NO_x$ is removed from exhaust gas from a stationary Diesel engine for a boiler, etc. among the internal-combustion engines, a method for adding reducing agents, such as ammonia, hydrogen or CO, to the exhaust gas so as to remove $NO_x$ by using the reducing agents is commonly used.

However, this method requires a device for separately loading the reducing agents and a special device for recovering and processing unreacted agents, thereby making the device for purifying exhaust gas complex and bulky.

Recently, in order to solve the above-mentioned problems, various methods for removing $NO_x$ from exhaust gas under an atmosphere of excessive oxygen have been proposed.

However, it has proven difficult for each of these methods to positively remove $NO_x$ from exhaust gas under all operation conditions because the exhaust gas has greatly changing concentrations of $NO_x$, CO, HC and Oxygen as well as greatly vacillating temperatures depending on respective operation conditions, such as exhaust gas from a gasoline engine of the fuel-direct-injection type.

In other words, a method has been disclosed (see Japanese Laid-Open Patent Publication No. 125250/1985 (Tokukaisho 60-125250) and the specification of the U.S. Pat. No. 4,297,328) in which an $NO_x$-decomposing catalyst consisting of crystalline aluminosilicate containing copper irons is used as the catalyst for removing $NO_x$ under an atmosphere of excessive oxygen.

The above-mentioned Laid-Open Patent Publication, however, merely discloses that nitrogen monoxide (NO) can be decomposed into nitrogen ($N_2$) and oxygen ($O_2$), and it is difficult for the above-mentioned method to remove $NO_x$ effectively under actual exhaust gas conditions.

Moreover, Japanese Laid-Open Patent Publication No. 100919/1988 (Tokukaisho 63-100919) discloses a method wherein exhaust gas is processed using a copper-containing catalyst under an atmosphere of oxygen in the presence of hydrocarbon (hereinafter, referred to as HC), that is, under an atmosphere of excessive oxygen, so that the reaction between $NO_x$ and HC preferentially progresses and so that NOx is effectively removed. This method is reported to be able to use either HC contained in the exhaust gas, or HC that is externally applied on demand.

The above-mentioned method includes a specific embodiment wherein exhaust gas is first allowed to contact the copper-containing catalyst so as to remove $NO_x$ and then contact an oxidizing catalyst so as to remove HC, carbon monoxide (hereinafter, referred to as CO), etc.

However, this method requires high optimal processing temperatures at which $NO_x$ can be sufficiently removed, and the removing effect is reduced at low temperatures; thus, the resulting problem is that this method is not sufficiently applied to removal of $NO_x$ from exhaust gas at the lean burn mode in a gasoline engine of the fuel-direct-injection type.

Furthermore, the catalyst in the above-mentioned method is inferior in heat resistance, and also has the problem of fast deterioration of the catalyst activity with time since the decomposing capability of $NO_x$ is irreversibly lowered in the case when it is exposed to high-temperature exhaust gas as in the case of the operation of a gasoline engine of the fuel-direct-injection type in the vicinity of the stoichiometrical air-fuel ratio.

In order to solve such problems, Japanese Laid-Open Patent Publication No. 171625/1989 (Tokukaihei 1-171625) discloses a method wherein: a copper-containing catalyst and an oxidizing catalyst or three way catalyst are placed parallel to each other in the flowing passage of exhaust gas, and when the exhaust-gas temperature becomes high, the gas is bypassed to the oxidizing-catalyst side or the three way catalyst side. However, the arrangement of the above-mentioned Laid-Open Patent Publication has the disadvantage of requiring a complicated purifying device for exhaust gas, resulting in a problem of high costs.

Moreover, the catalysts for purifying NOx, disclosed in the above-mentioned three Laid-Open Patent Publications, are inferior in the capability of purifying HC, CO and $NO_x$ in exhaust gas at the vicinity of the stoichiometrical air-fuel ratio, as compared with the three way catalyst.

Furthermore, International Patent Application WO 93/08383 discloses a catalyst which oxidizes and absorbs $NO_x$ from exhaust gas under an oxidizing atmosphere and discharges $NO_x$ to the exhaust gas under a reducing atmosphere, and a $NO_x$-purifying method by the use of the catalyst.

However, in order to oxidize and absorb $NO_x$, the catalyst of the above-mentioned Patent Application requires that nitrogen monoxide be preliminarily oxidized into nitrogen dioxide, and since the oxidization of nitrogen monoxide is difficult to carry out at low temperatures, it is difficult to apply this method to the exhaust-gas purifying of gasoline engines of the fuel-direct-injection type.

It is an objective of the present invention to provide a simple method that makes it possible to positively eliminate exhaust gas for a long time under all operation conditions, even though, like exhaust gas from a gasoline engine of the fuel-direction-injection type, the exhaust gas has noxious ingredients whose compositions vary depending on the operation conditions and whose temperature changes greatly depending thereon.

DISCLOSURE OF THE INVENTION

In order to solve the above-mentioned problems, the exhaust-gas purifying method for gasoline engines of the present invention is characterized in that exhaust gas from a gasoline engine of the fuel-direct-injection type is purified by an exhaust-gas-purifying catalyst that uses at least one kind of noble metals and transition metals.

The exhaust gas from the gasoline engine of the fuel-direct-injection type varies between the first exhaust gas state and the second exhaust gas state that forms a more oxidizing, low-temperature atmosphere as compared with the first exhaust gas state, depending on changes in the air-fuel ratio.

More specifically, the exhaust-gas temperature of the first exhaust gas state is in the range of 350 to 800° C. at the inlet of the catalyst, and the exhaust-gas temperature of the second exhaust gas state is in the range of 200 to 500° C. at the inlet of the catalyst, and more preferably in the range of 200 to 350° C.

Exhaust gas is purified by removing HC, CO and $NO_x$ from the exhaust gas by the use of the catalyst. Here, the air-fuel ratio is changed within the range of 13 to 50. The first exhaust gas state appears when the air-fuel ratio is in the range of 13 to 15, and the second exhaust gas state appears when the air-fuel ratio exceeds the air-fuel ratio of 15.

The above-mentioned catalyst is not specifically limited, as long as it is an exhaust-gas-purifying catalyst containing at least one kind of noble metal, such as platinum, and transition metals. And as one of the most preferable materials, there is listed a material which is obtained by allowing at least one kind of noble metal and transition metals to mix with or to be carried by a fire-resistant inorganic oxide (pore diameter 10 to 30 nm) in powder form, such as alumina, that serves as a porous carrier (substrate), and this material is further allowed to be applied to and maintained on a monolith carrier.

In the monolith carrier, a number of honeycomb through passes (cells) are formed in the direction of the exhaust-gas flow, a catalyst layer is formed inside each of the cells through coating. Here, the volume of the monolith carrier is selected from the range of 0.1 liter to 10 liter depending on the loading property of the monolith carrier and the cylinder capacity of the engine.

Not less than one kind of noble metals, selected from the group of platinum, palladium, rhodium and iridium, is used as the above-mentioned noble metal, and the above-mentioned transition metal is selected from manganese, iron, cobalt, copper, nickel, etc. Among these metals, platinum or iridium is preferably used since they have a superior purifying capability in a low-temperature, oxidizing atmosphere; and it is more preferable to use platinum or iridium in combination with other noble metals and transition metals.

With respect to the sources of the noble metals and the sources of the transition metals, metal elements, oxides, halogenides, nitrates, sulfates, salts from organic acids, and other compounds can be used.

Among the sources of the noble metals and the sources of the transition metals, water-soluble compounds, such as chloroplatinic acid and rhodium nitrate having water solubility, are preferably used. This is because, in order to allow particles of the noble metals and transition metals whose particle diameter is several nano-meters to be carried by a fire-resistant inorganic oxide (pore diameter 10 to 30 nm) in powder form, such as alumina, that serves as a porous carrier, a specific method (an impregnation method) can be adopted, wherein the carrier is impregnated with the aqueous solutions of the noble metals and transition metals and then dried and calcined so that only the noble metals and the transition metals remain in the fire-resistant inorganic oxide.

Such a catalyst, when it contains the noble metals, is preferably arranged so that the total content of the noble metals is set in the range of 0.01 to 50 g/liter with respect to the catalyst volume. When the content is less than 0.01 g/liter, it is not possible to obtain a sufficient catalyst activity, and in particular, at low temperatures, it is not possible to obtain a sufficient catalyst activity. Even if the content exceeds 50 g/liter, it is not possible to obtain the corresponding activity.

Further, the catalyst, when it contains the transition metals, is preferably arranged so that the total content of the transition metals is set in the range of 0.01 to 50 g/liter with respect to the catalyst volume. When the content is less than 0.01 g/liter, it is not possible to obtain a sufficient catalyst activity. Even if the content exceeds 50 g/liter, it is not possible to obtain the corresponding activity.

With respect to the fire-resistant inorganic oxide, no specific limitation is normally given as long as it is used as a catalyst carrier used for exhaust gas; for example, a-alumina, or active alumina of $\gamma$, $\delta$, $\eta$ or $\theta$, titania or zirconia or composite oxides of these elements, such as, for example, alumina-titania, alumina-zirconia and titania-zirconia, are listed, and among these, active aluminas are used most preferably.

It is preferable for the fire-resistant inorganic oxide to have a BET (Brunauer-Emmett-Teller) surface area in the range of 50 to 200 $m^2$/g. The noble metals and transition metals may be carried on the fire-resistant inorganic oxide in a coexistent manner or in an independent manner.

Moreover, oxides or compounds of rare-earth metals, such as cerium oxide, lanthanum oxide, praseodymium oxide and yttrium oxide, may be added to the catalyst as co-catalysts.

In addition, typical elements, such as tin and zinc, alkaline metals, such as sodium and potassium, alkaline earth metals, such as magnesium, calcium and barium, or oxides and compounds of these may be added to the catalyst. These are used to improve the heat resistance of the catalyst and to accelerate oxidizing and reducing reactions caused by the active ingredients of the catalyst.

Specific methods of forming the catalyst include: (1) a method in which the catalyst composition itself is formed into a predetermined shape, such as a globular shape or a column shape, and applied, and (2) another method in which: the catalyst composition is wet ground by a ball mill or other machine, and integral structural bodies, which are three-dimensional structural bodies, are dipped into the resulting slurry so that the integral structural bodies are coated with the catalyst composition so as to serve as the catalyst, and other methods.

The carriers, referred to as the integral structural bodies, include, for example, honeycomb monolith carriers, foam-shaped carriers and corrugate-shaped carriers, and with respect to the material thereof, those made of ceramic or metal are preferably used.

The following description will discuss methods for preparing the catalyst:

(1) In the case when the catalyst composition itself is applied as the catalyst, the following and other methods are listed: (a) a method in which after the catalyst composition has been sufficiently mixed, it is formed into a column shape, a globular shape and other shapes so as to serve as the catalyst, and (b) another method in which after the fire-resistant inorganic oxide has been formed into a predetermined shape, such as a globular shape or a column shape, it is coated with the catalyst composition.

(2) In the case when the integral structural bodies or inactive mineral carriers (hereinafter, referred to as "the integral structural bodies, etc.") are applied, the following and other methods are listed: (a) a method in which: the catalyst composition, in one lot, is loaded into a ball mill or other machine, and wet ground into aqueous slurry, and the integral structural bodies, etc., are dipped into the aqueous slurry, and dried and calcined, (b) another method in which the fire-resistant inorganic oxide is wet ground by a ball mill or other machine into aqueous slurry, and the integral structural bodies, etc., are dipped into the aqueous slurry, and dried and calcined, and then the integral structural bodies, etc., coated with the fire-resistant inorganic oxide, are dipped into a water solution containing a noble metal, such as platinum, and a transition metal, and dried and calcined, and (c) the other method in which: the noble metal and the transition metal, which serve as the catalyst compositions, are preliminarily carried by the fire-resistant inorganic oxide so as to obtain the fire-resistant inorganic oxide carrying the noble metal and/or the transition metal, and this is formed into aqueous slurry by the use of a ball mill or other machine, and then the integral structural bodies, etc., are dipped into the aqueous slurry, and dried and calcined so as to obtain the integral structural bodies, etc., coated with the fire-resistant inorganic oxide carrying the noble metal and/or the transition metal. Here, in particular, the above-mentioned methods (a) (b) (c) of (2) are preferably used.

Moreover, in the case of the integral structural bodies, etc., coated with the catalyst composition, the amount of coating of the catalyst composition is preferably set in the range of 50 to 300 g per liter of the integral structural bodies, etc. The amount of less than 50 g causes degradation in the catalyst activity, and the amount of coating exceeding 300 g fails to obtain the corresponding catalyst activity.

The following description will discuss a method for purifying exhaust gas from a gasoline engine of the fuel-direct-injection type by using the above-mentioned catalyst. The catalyst, as explained earlier, is installed in the exhaust-gas flowing passage of the exhaust port of the gasoline engine of the fuel-direct-injection type. The installation position thereof is freely determined as long as it is loaded into a vehicle; however, it is preferable to set the temperature of the exhaust gas at the inlet of the catalyst in the range of 200° C. to 500° C. in the case of the air-fuel ratio of more than 15 to 50, and also to set it in the range of 350° C. to 800° C. in the case of the air-fuel ratio of 13 to 15.

In the above-mentioned method, in exhaust gas forming an atmosphere of excessive oxygen, that is, in an oxidizing atmosphere whose air-fuel ratio ranges from more than 15 to 50, HC and CO are removed from the exhaust gas by oxidation while NO, which is a main ingredient of $NO_x$ in the exhaust gas, is progressively decomposed and purified by reduction with the help of the catalyst, within the range of 200 C. to 500 C. of the exhaust gas temperature, more preferably, within the range of 200 C. to 350 C.

Normally, in the case when exhaust gas forms an atmosphere of excessive oxygen and the temperature of the exhaust gas at the inlet of the catalyst is higher than 500° C., it is difficult for the catalyst to virtually reduce $NO_x$ because NO is not involved in the decomposing reaction, but rather oxidized into $NO_2$ or involved in production of $NO_2$ due to double decomposition reaction.

However, in the case of the gasoline engine of the fuel-direct-injection type, in the lean burn mode in which the air-fuel ratio exceeds 15, since the fuel is directly injected inside the cylinder of the engine, the temperature of the exhaust gas at the inlet of the catalyst normally seldom becomes higher than 500° C., or seldom becomes higher than 350° C. depending on cases when the vehicle is running within a city, due to heat of vaporization taken by the fuel.

Accordingly, even under an atmosphere of excessive oxygen, that is, an oxidizing atmosphere like exhaust gas within the lean burn mode in the gasoline engine of the fuel-direct-injection type, in the case when the temperature of the exhaust gas becomes not more than 500° C., or not more than 350° C., or normally not more than 300° C., that is, when it becomes lower than the exhaust-gas temperature at the time of the stoichiometrical air-fuel ratio, the above-mentioned catalyst is properly applied to sufficiently purify the exhaust gas without raising any problem in its practical use.

Moreover, under an exhaust-gas state in which oxidizing gases ($O_2$ and $NO_x$) and reducing gases (HC and CO) are balanced stoichiometrically due to the fact that the exhaust gas is kept in the vicinity of the stoichiometrical air-fuel ratio (14.7) as in the case of an accelerating operation and a high-load operation, or under a reducing atmosphere of the exhaust gas that occurs due to the fact that the air-fuel ratio is smaller than the stoichiometrical air-fuel ratio, it is possible to remove $NO_x$ contained in the exhaust gas effectively by the use of the catalyst even if the temperature of the exhaust gas exceeds 350 C., or in particular exceeds 500 C., because the exhaust gas does not form an atmosphere of excessive oxygen.

BRIEF DESCRIPTION OF THE DRAWING

FIG. 1 is a schematic view of a gasoline engine used in a process for purifying exhaust gas from a gasoline engine of the present invention.

THE BEST MODE FOR CARRYING OUT THE INVENTION

The following description will discuss an embodiment of the present invention.

The process for purifying exhaust gas from a gasoline engine of the present invention is preferably applied to, for example, a gasoline engine 1 of the fuel-direct-injection type as illustrated in FIG. 1, which discharges exhaust gas that varies between a first exhaust-gas state represented by an exhaust gas having an air-fuel ratio in the vicinity of the stoichiometrical air-fuel ratio (14.7) and a second exhaust-gas state represented by an exhaust gas having an air-fuel ratio greater than the stoichiometrical air-fuel ratio.

The first exhaust-gas state is defined as a state at the time of high output as in the case of an accelerating operation and a high-load operation, and the second exhaust-gas state is defined as a state at the time of low output as in the case of a constant-speed operation. Therefore, the second exhaust-gas state forms a more oxidizing, lower-temperature atmosphere as compared with the first exhaust-gas state.

Next, with respect to the gasoline engine 1, explanations will be given of its fuel-supplying control including the exhaust-gas purifying process: The gasoline engine 1 is provided with a cylinder 2 that serves as a combustion chamber for gasoline as a fuel, a piston 3 that reciprocally moves inside the cylinder 2 in response to the burning of the fuel and the discharge of the combustion gas in the axial direction of the cylinder 2, and a crank 4 that converts the reciprocating motion of the piston 3 to rotary motion.

Further, a suction port 5 for introducing air into the cylinder 2 and an exhaust port 6 for discharging burnt gas out of the cylinder 2 as exhaust gas are installed at the top of the gasoline engine 1.

The suction port 5 has a suction valve 5a for opening and closing an opening to the cylinder 2 and a tube section 5b that extends outwards from the top of the gasoline engine 1. The exhaust port 6, on the other hand, has an exhaust valve 6a for opening and closing an opening to the cylinder 2. Here, the opening and closing operations of the suction valve 5a and the exhaust valve 6a are mechanically controlled in accordance with the rotation angle of the crank 4.

Moreover, on the top of the gasoline engine 1 are installed an ignition plug 7 located between the suction port 5 and the exhaust port 6, an injector 8 that is adjacent to the opening of the suction port 5 and that is used for injecting the fuel, and a combustion-pressure sensor 9 that detects the torque variation of the gasoline engine 1 by successively measuring the combustion pressure inside the cylinder 2. Here, the injector 8 is also designed to measure the injection pressure of gasoline that is injected into the cylinder 2. A crank-position sensor 10, which optically measures the rotation position of the crank 4, is installed on the gasoline engine 1.

An oxygen sensor 11 for measuring the oxygen concentration of exhaust gas is installed in the flowing path of the exhaust port 6, and a purifying-use catalyst 12, which contains, for example, a noble metal, and which serves as a catalyst for removing noxious ingredients such as hydrocarbon (HC), carbon monoxide (CO) and nitrogen oxides ($NO_x$), is further installed on the downstream side of the oxygen sensor 11.

In addition, an engine-controlling computer 13, which controls the ignition timing of the ignition plug 7 and the amount of fuel injection of the injector 8 respectively, is installed so as to control the air-fuel ratio that depends on the ignition timing of the ignition plug 7 and the injector 8, in accordance with input signals regarding an accelerator, not shown, temperatures, water temperatures, etc., and various detection signals from the injector 8, the combustion-pressure sensor 9, the crank-position sensor 10 and oxygen sensor 12.

Next, with respect to the above-mentioned purifying-use catalyst 12, the manufacturing method thereof will be described by means of an example.

First, to 100 grams of porous active alumina in powder having a BET surface-area of 100 m$^2$ are added a water solution of platinum dinitro-diamino nitrate containing 2 grams of platinum and a water solution of rhodium nitrate containing 0.4 grams of rhodium, and then mixed, and the resulting mixture is dried for two hours at 120° C., and successively calcined for two hours at 500° C. so that catalyst powder, which consists of active alumina having fine particles of platinum and rhodium dispersed on its porous surface and inside its pores, is obtained.

Thereafter, the catalyst powder, 40 grams of commercial cerium-oxide powder having a BET surface-area of 20 m$^2$ and 10 grams of commercial zirconium-oxide powder having a BET surface-area of 80 m$^2$ are wet ground by a ball mill, thereby obtaining aqueous slurry. The cerium oxide serves as an oxygen-reserving agent, and suppresses the effect of variations of the oxygen concentration in the exhaust gas in response to excess and shortage of the oxygen concentration in the exhaust gas. The zirconium oxide is used to prevent solidification of rhodium to alumina.

Successively, a commercial cordierite honeycomb carrier (manufactured by NGK INSULATORS LTD., 33 mmΦ in diameter, 76 mmL in length and 65 ml in volume, having 400 gas-permeable cells per 1 square inch in cross-section) is dipped into the aqueous slurry, and then excess aqueous slurry is removed from the honeycomb carrier by blowing it using compressed air. Then, the honeycomb carrier, which has the aqueous slurry on the inside faces of each cell, is dried for two hours at 120° C., and a finished catalyst (A) is obtained. The finished catalyst (A) carries 2% by weight of platinum and 0.4% by weight of rhodium with respect to the active alumina.

The following description will discuss a manufacturing method of a comparative catalyst that is given as the comparative example of the purifying-use catalyst 12. First, a mixture, made by mixing 100 grams of commercial zeolite of the ZSM-5 type ($SiO_2/Al_2O_3$=40) with 400 grams of pure water, was stirred for two hours at 98° C., and then 600 ml of an aqueous solution containing 0.2 mol/liter of copper-ammine complex was slowly dripped into the mixture at 80° C.

Thereafter, the zeolite containing the copper-ammine complex was obtained by filtering the mixture, and this was sufficiently rinsed, and then dried for 24 hours at 120° C. so that a zeolite catalyst in powder was obtained. The zeolite catalyst in powder was wet ground by a ball mill, and an aqueous slurry was obtained. Then, in the same manner as described in Embodiment 1, a finished catalyst (Z) was obtained by using the aqueous slurry. The finished catalyst (Z) carried 5.6% by weight of copper with respect to the zeolite.

Next, with respect to the finished catalysts (A) and (Z), the following initial performance test and performance test with time were respectively carried out by using reaction gas composition A that serves as an example of an exhaust-gas composition in the vicinity of the stoichiometrical air-fuel ratio (14.7) in a gasoline engine of the fuel-direct-injection type and reaction gas composition B that serves as an example of an exhaust-gas composition in the vicinity of an air-fuel ratio (36) within the lean burn mode in the gasoline engine of the fuel-direct-injection type.

The above-mentioned reaction gas composition A consisted of 3500 ppm of nitrogen monoxide (NO) acting as $NO_x$, 3500 ppm of propylene ($C_3H_6$) (converted to methane), 0.25% by volume of carbon monoxide (CO), 0.5% by volume of oxygen ($O_2$), 10% by volume of water vapor, 13.5% by volume of carbon dioxide, and nitrogen ($N_2$) that covered the rest of the composition.

The above-mentioned reaction gas composition B consisted of 600 ppm of nitrogen monoxide (NO) acting as $NO_x$, 3000 ppm of propylene ($C_3H_6$) (converted to methane), 0.24% by volume of carbon monoxide (CO), 15.0% by volume of oxygen ($O_2$), 6% by volume of water vapor, 6% by volume of carbon dioxide, and nitrogen ($N_2$) that covered the rest of the composition.

Initial Performance Test (Reaction Test 1)

The respective finished catalysts (A) and (Z) were loaded into stainless reaction tubes, each having 34.5 mmΦ in diameter and 300 mm in length, so that catalyst beds were formed respectively, and then the above-mentioned reaction gas composition A was introduced into the respective catalyst beds under a condition of a spacial velocity of 20000 $Hr^{-1}$. Purifying rates of CO, HC and $NO_x$ were respectively measured at a temperature of 450° C. at the inlet of each catalyst, thereby evaluating the catalyst performances of the respective finished catalysts (A) and (Z).

The reaction test 1 is a test for evaluating the catalyst performance with respect to an exhaust-gas composition within a region of accelerated running in which the air-fuel ratio of the gasoline engine of the fuel-direct-injection type is controlled to coincide with the stoichiometrical air-fuel ratio. The results of the measurements are listed in Table 1.

(Reaction Test 2)

The respective finished catalysts (A) and (Z) were evaluated on their catalyst performances by carrying out tests in the same manner as the above-mentioned reaction test 1 except that reaction gas composition A was changed to reaction gas composition B and that the temperature at the inlet of the catalyst beds was changed from 450° C. to 250° C. The reaction test 2 is a test for evaluating the catalyst performance with respect to an exhaust-gas composition within a region of constant running in which the air-fuel ratio of the gasoline engine of the fuel-direct-injection type is controlled to be within the lean burn mode. The results of the measurements are listed in Table 1.

TABLE 1

| Cata- | Purifying Rate in Reaction Test 1 | | | Purifying Rate in Reaction Test 2 | | |
| --- | --- | --- | --- | --- | --- | --- |
| lysts | CO | HC | $NO_x$ | CO | HC | $NO_x$ |
| Embodiment A | 98% | 96% | 95% | 100% | 100% | 90% |
| Comp. Example Z | 30% | 40% | 30% | -5% | 6% | 0% |

In the above Table, the description of minus (−) that is seen in CO purifying rate in Reaction Test 2 in the comparative example indicates that an increase occurs in the CO concentration after passing through the catalyst.

Performance Test with Time

The respective finished catalysts (A) and (Z) were loaded into multi-converters so that loaded catalyst beds were formed. Exhaust gas that had an air-fuel (A/F) ratio of 20/1 was prepared by mixing exhaust gas obtained during a cruising operation of a commercial gasoline-electronic-control engine with air.

The above-mentioned exhaust gas was allowed to pass the respective loaded catalyst beds for 20 hours under conditions of a spacial velocity (S.V.) of 160000 $Hr^{-1}$ and a catalyst-bed temperature of 800° C. Then, the aforementioned initial performance test and reaction tests 1 and 2 were respectively carried out to evaluate the catalyst performances with time of the finished catalysts (A) and (Z). The results of the measurements are listed in Table 2.

TABLE 2

| Cata- | Purifying Rate in Reaction Test 1 | | | Purifying Rate in Reaction Test 2 | | |
| --- | --- | --- | --- | --- | --- | --- |
| lysts | CO | HC | $NO_x$ | CO | HC | $NO_x$ |
| Embodiment A | 96% | 95% | 92% | 100% | 98% | 88% |
| Comp. Example Z | 10% | 20% | 5% | 0% | 0% | 0% |

As described above, the method of the present embodiment makes it possible to remove CO, HC and $NO_x$ that form noxious ingredients very effectively in both of exhaust gas compositions A and B, as compared with the comparative example shown in Table 1. In addition, as shown by Table 2, the method of the present embodiment is also superior in heat resistance in respect of catalyst activities as well as in durability with time.

Consequently, the method of the above-mentioned embodiment eliminates the necessity of having to use another reducing agent that has been required in conventional methods, and positively removes NOx from exhaust gas under an oxidizing atmosphere at a relatively low temperature of 250° C. stably for a long time, and the catalyst activities are maintained even in high-temperature exhaust gas having an air-fuel ratio in the vicinity of the stoichiometrical air-fuel ratio so that the noxious ingredients of the exhaust gas is positively removed stably for a long time.

In addition, the above-mentioned method makes it possible to avoid a conventional complex construction requiring to provide a catalyst containing copper and three way catalyst separately and to bypass and switch the exhaust-gas flowing path to the catalysts depending on temperatures, and also eliminates the necessity of having to oxidize nitrogen monoxide in exhaust gas into nitrogen dioxide when the temperature of the exhaust gas is low.

As a result, by merely using the single purifying-use catalyst 12, the above-mentioned method makes it possible to remove the noxious ingredients from exhaust gas that varies depending on changes in the air-fuel ratio between the first exhaust-gas state during an accelerating operation, etc., and the second exhaust-gas state during a constant operation, etc., that forms a more oxidizing, low-temperature atmosphere as compared with the first exhaust gas state, as in the case of exhaust gas from a gasoline engine of the fuel-direct-injection type; therefore, it becomes possible to simplify the purifying operation for exhaust gas under all driving conditions.

Furthermore, since the catalyst of the above-mentioned method is superior in heat resistance with respect to exhaust gas whose noxious ingredients have their compositions varied in a wide range and whose temperature varies also in a wide range, as described earlier, it becomes possible to purify exhaust gas within a wide temperature range in a stable manner, and since it is also superior in durability, it becomes possible to exert superior catalyst activities in a stable manner for a long time.

POTENTIAL FOR INDUSTRIAL USE

The process for purifying exhaust gas from a gasoline engine of the fuel-direct-injection type of the present invention makes it possible to purify exhaust gas in various states that varies between the first exhaust gas state and the second exhaust gas state that forms a more oxidizing, low-temperature atmosphere as compared with the first exhaust gas state in response to changes in the air-fuel ratio, depending on various operation conditions, by merely using a single catalyst; therefore, it becomes possible to simplify the purifying operation for exhaust gas under all driving conditions. In addition, the above-mentioned process ensures the catalyst activities in a wide temperature range, and also ensures superior durability so that it becomes possible to exert the catalyst activities in a stable manner for a long time.

The invention claimed is:

1. A catalyst for purifying exhaust gas under the conditions of exhaust gas produced in gasoline engines of a fuel-direct-injection type,
   the catalyst comprising (i) platinum or palladium and (ii) cerium carried by or mixed with a fire-resistant inorganic oxide,
   the fire-resistant inorganic oxide having a BET surface area in a range of 50 to 200 $m^2/g$ and a pore diameter in a range of 10 to 30 nm,
   the catalyst containing the platinum or palladium in a range of 0.01 to 50 g/liter with respect to a catalyst volume,
   the fire-resistant inorganic oxide being at least one kind of α-alumina, γ-alumina, δ-alumina, η-alumina, active alumina of θ-alumina, titania, zirconia, and composite oxides thereof,
   wherein the catalyst purifies exhaust gases produced in gasoline engines of a fuel-direct-injection the under (i) a first exhaust gas state in which an air-fuel ratio is in a range of 13 to 15, and an exhaust-gas temperature is in a range of 350 to 800° C., and purifies an exhaust gas produced in gasoline engines of a fuel-direct-injection type under (ii) a second exhaust gas state in which the air-fuel ratio exceeds an air-fuel ratio of 15, and the exhaust-gas temperature is in a range of 200 to 350° C.

2. The catalyst as defined in claim 1, wherein the catalyst purifies the exhaust gas when the exhaust-gas temperature of the second exhaust gas state at the inlet of the catalyst is lower than the exhaust-gas temperature of the first exhaust gas state at the inlet of the catalyst.

3. The catalyst as defined in claim 1, wherein the exhaust gas is purified by removing hydrocarbon, carbon monoxide and nitrogen oxides from the exhaust gas.

4. The catalyst as defined in claim 1, further comprising at least one kind of noble metal selected from the group consisting of rhodium and iridium.

5. The catalyst as defined in claim 1, further comprising iridium.

6. The catalyst as defined in claim 1, further comprising at least one transition metal selected from the group consisting of manganese, iron, cobalt, copper and nickel.

7. The catalyst as defined in claim 1, further comprising at least one rare-earth oxide selected from the group consisting of lanthanum oxide, praseodymium oxide and yttrium oxide.

8. The catalyst as defined in claim 1, wherein the catalyst removes at least 92% of $NO_x$ from the exhaust gas in the first exhaust gas state and removes at least 88% of $NO_x$ from the exhaust gas in the second exhaust gas state.

* * * * *